(12) United States Patent
Gangadarappa (10) Patent No.: US 11,915,279 B2
(45) Date of Patent: Feb. 27, 2024

(54) AUTOMATED INVOICE MANAGEMENT SYSTEM AND PLATFORM

(71) Applicant: Chayapathy Gangadarappa, Fulton, GA (US)

(72) Inventor: Chayapathy Gangadarappa, Fulton, GA (US)

( * ) Notice: Subject to any disclaimer, the term of this patent is extended or adjusted under 35 U.S.C. 154(b) by 59 days.

(21) Appl. No.: 17/176,169

(22) Filed: Feb. 15, 2021

(65) Prior Publication Data

US 2021/0350429 A1    Nov. 11, 2021

Related U.S. Application Data

(60) Provisional application No. 63/058,322, filed on Jul. 29, 2020.

(51) Int. Cl.

| | |
|---|---|
| *G06Q 30/04* | (2012.01) |
| *G06N 20/00* | (2019.01) |
| *G06V 30/40* | (2022.01) |
| *G06V 30/412* | (2022.01) |
| *G06V 30/10* | (2022.01) |

(52) U.S. Cl.
CPC ............ *G06Q 30/04* (2013.01); *G06N 20/00* (2019.01); *G06V 30/40* (2022.01); *G06V 30/412* (2022.01); *G06V 30/10* (2022.01)

(58) Field of Classification Search
CPC ...... G06Q 30/04; G06N 20/00; G06V 30/412; G06V 30/10; G06V 30/40
See application file for complete search history.

(56) References Cited

U.S. PATENT DOCUMENTS

| | | | |
|---|---|---|---|
| 10,943,274 B2* | 3/2021 | Ghatage | .................. G06N 5/04 |
| 2018/0101914 A1* | 4/2018 | Samuel | ............... G06Q 20/401 |
| 2020/0410562 A1* | 12/2020 | Balasubramanian | ........................ G06Q 30/0637 |

* cited by examiner

*Primary Examiner* — Peter Ludwig
*Assistant Examiner* — Reva R Moore (57) ABSTRACT

In one aspect, In one aspect, a computerized method of an automated invoice management and analysis comprising with an invoice management system, receiving a purchase order or invoice in any digital image format. The method includes using an optical character recognition system to extract plain text the from the purchase order or invoice. The method includes parsing and formatting the plain text data with a machine learning system into a specified consistent format. The method includes communicating the formatted plain text data to a third-party service to complete a specified transaction.

2 Claims, 7 Drawing Sheets

AUTOMATED INVOICE MANAGEMENT SYSTEM AND PLATFORM

CROSS-REFERENCE TO RELATED APPLICATIONS

This application is a continuation of and claims priority to U.S. PROVISIONAL patent application No. 63/058,322, titled Invoice Management System and Platform and filed on 29 Jul. 2020. This application is hereby incorporated by reference in its entirety.

This application is a continuation of and claims priority to U.S. PROVISIONAL patent application No. 60/035,613, titled PTP Blockchain Network and filed on 9 Jun. 2020. This application is hereby incorporated by reference in its entirety.

BACKGROUND

1. Field

Invoice management is an integral part of any modern B2B procurement system. The challenge inherent in building a good invoice management system is maintaining accuracy while generating and processing up to thousands of invoices a day—each of which could contain hundreds of line items. Because many suppliers send invoices directly to buyers via email or other non-structured means, invoice management often involves a great deal of manual data entry which is both slow and error prone. Additionally, any errors the buyer spots in a supplier invoice must be resolved in time consuming discussions between both parties. Finally, these invoice management systems must be integrated with industry standard procurement networks and enterprise resource planning platforms (ERPs) (e.g. SAP S/4HANA, etc.) in order to keep data consistent and offer useful plugins. This is a nontrivial effort, often requiring expensive consultants and subject matter experts on each platform requiring integration. More recent art improves on the first problem by enabling users to scan non-ideal data sources into a system via OCR, reducing the necessity for error prone and slow manual data entry. However, no current art exists which is also integrated out of the box with modern ERPs and procurement systems. Therefore, no current product seamlessly solves the issue of maintaining consistent state between multiple disparate systems. In particular, nothing exists which integrates with systems on both sides of the buyer/supplier relationship in order to catch errors on the supplier's side where they can be quickly addressed unilaterally to save significant time.

SUMMARY OF THE INVENTION

In one aspect, a computerized method of an automated invoice management and analysis comprising with an invoice management system, receiving a purchase order or invoice in any digital image format. The method includes using an optical character recognition system to extract plain text the from the purchase order or invoice. The method includes parsing and formatting the plain text data with a machine learning system into a specified consistent format. The method includes communicating the formatted plain text data to a third-party service to complete a specified transaction.

BRIEF DESCRIPTION OF THE DRAWINGS

The present application can be best understood by reference to the following description taken in conjunction with the accompanying figures, in which like parts may be referred to by like numerals.

The Figures described above are a representative set and are not an exhaustive with respect to embodying the invention.

DESCRIPTION

Disclosed are a system, method, and article of an automated invoice management system and platform. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Application programming interface (API) is a computing interface that defines interactions between multiple software intermediaries. An API can define the kinds of calls or requests that can be made by various computer-based entities, how to make the calls, the data formats that should be used for said calls, the conventions to follow for said calls, etc. An API can also provide extension mechanisms so that users can extend existing functionality in various ways and to varying degrees. An API can be entirely custom, specific to a component, and/or designed based on an industry-standard to ensure interoperability. An API can enable modular programming, allowing users to use the interface independently of the implementation.

Blockchain is a digital ledger where transactions are recorded chronologically and publicly. Each block typically contains a cryptographic hash of the previous block, a timestamp and transaction data.

Business-to-business (B2B) describes a situation where one business makes a commercial transaction with another.

Enterprise resource planning (ERP) is the integrated management of main business processes, often in real time and mediated by software and technology.

JSON (JavaScript Object Notation) is an open standard file format, and data interchange format, that uses human-readable text to store and transmit data objects consisting of attribute—value pairs and array data types (or any other serializable value). In other embodiments, other data formats such as XML can be utilized in lieu of JSON.

Optical character recognition or optical character reader (OCR) is the electronic conversion of images of typed, handwritten, or printed text into machine-encoded text, whether from a scanned document, a photo of a document, a scene-photo and/or from subtitle text superimposed on an image.

Purchase order (PO) is a commercial document and first official offer issued by a buyer to a seller indicating types, quantities, and agreed prices for products or services.

Software as a service (SaaS) can be a software licensing and delivery model in which software is licensed on a subscription basis and is centrally hosted.

Exemplary Systems

Figure 1:
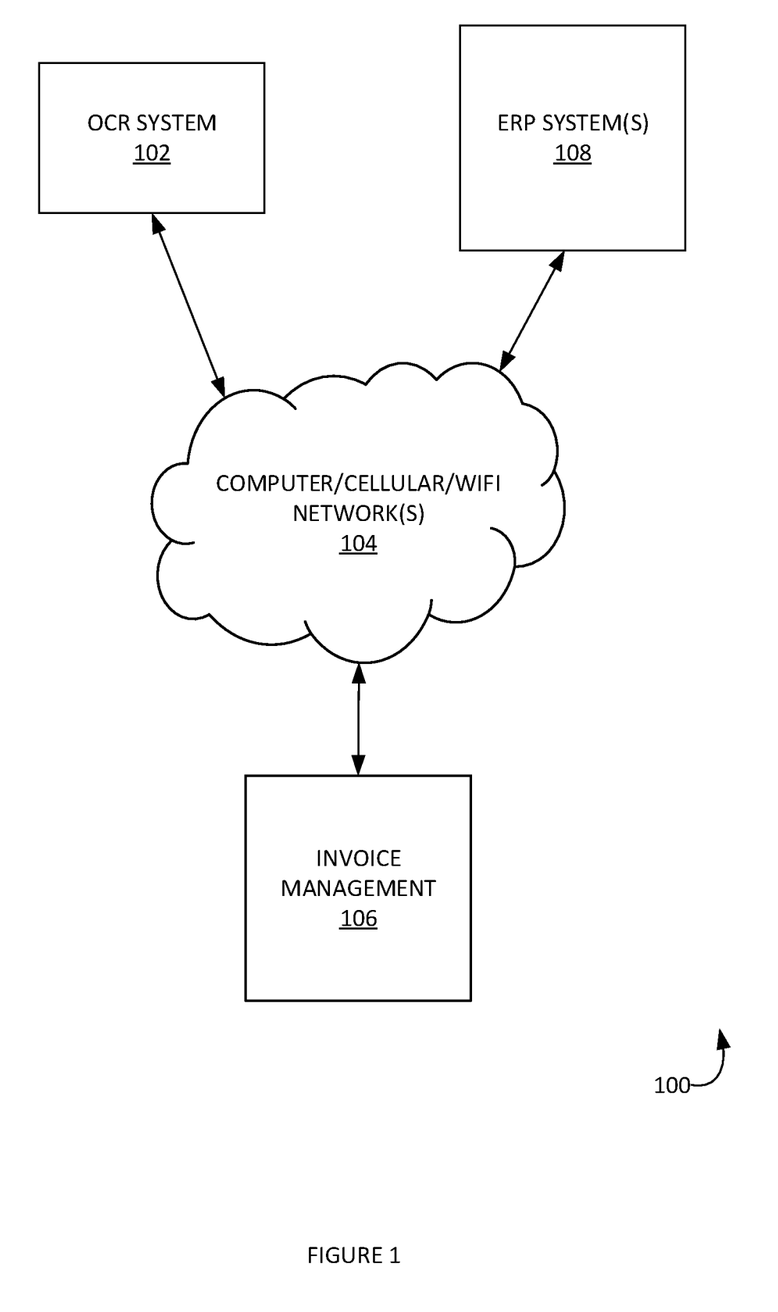
FIG. 1 schematically depicts an automated invoice management system and platform, according to some embodiments.

FIG. 1 schematically depicts an automated invoice management system and platform 100, according to some embodiments. Automated invoice management system and platform 100 can include an invoice management 106.

Figure 4:
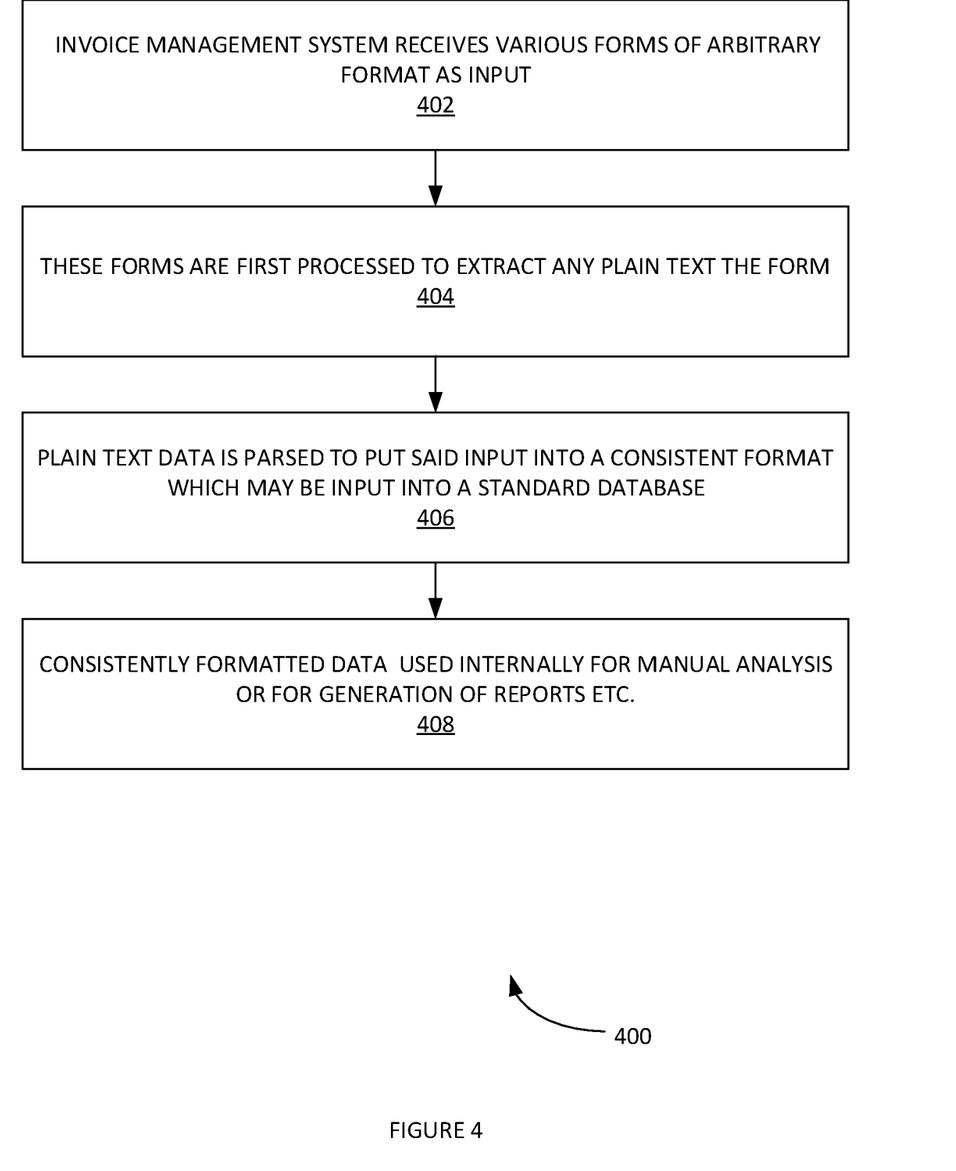
FIG. 4 illustrates an example process for automated invoice management, according to some embodiments.

In one example invoice management 106 can implement process 400 of FIG. 4 infra. Invoice management 106 can receive various forms of arbitrary format as input. These forms are first processed by via OCR system 104, so that plain text may be extracted from the form. Next, this plain text data is processed by the AI system which parses said input into a consistent format which may be input into a standard database. This data may be used internally for manual analysis or for the generation of reports or it may be sent to third party services to complete transactions and sync data.

Figure 2:
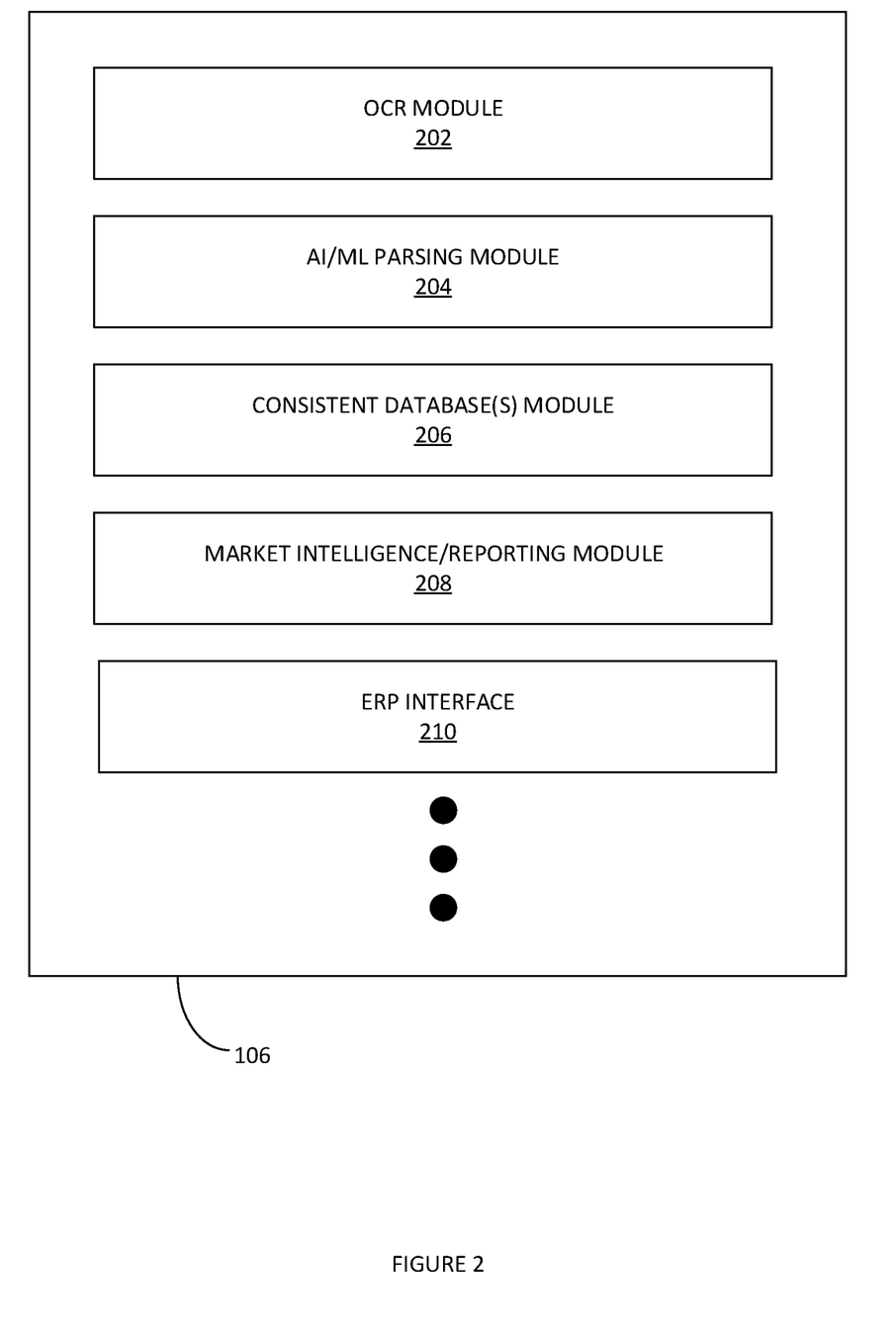
FIG. 2 illustrates an example invoice management system, according to some embodiments.

In one example, an OCR system 102 (e.g. using OCR module 202 infra, etc.) can be used jointly with an artificial intelligence system (AI) (e.g. AI/ML parsing module 204 infra, etc.) in order to process data from invoices in non-standard format (e.g. a digital image or PDF) into a consistent data format consumable by standard database (e.g. consistent database(s) module 206 infra, etc.). This system may be used by a buyer and/or supplier to input invoices into their respective ERPs (e.g. ERP system(s) 108) and/or procurement networks. Seamless integration with existing ERPs and procurement networks. This is made possible by the invention's database of standardized data which allows simple serialization for data transport to various third-party API endpoints. For example, the invention may interface with Open ICS in order to log invoice data into SAP Ariba (see discussion infra). In various embodiments, an integrated exception resolving system on the supplier end, which alerts the supplier to purchase order (PO) mismatches, incorrect line items, and PO/value mismatches. This prevents the need for lengthy discussions that may occur if an incorrect invoice is sent to a buyer. In various embodiments, allows for suppliers to create multiple non-PO invoices to be processed in a similar fashion as a typical PO associated invoice, including all ERP integrations. In various embodiments, a portal available in various mediums such as web or application whereby a vendor may track the status of their invoices and any disputes may be resolved through a trackable ticket system rather than disorganized email threads and spreadsheets. In various embodiments, the ability to generate analysis of data from processed invoices such as market intelligence reports, which could clearly demonstrate cost trends, buyer purchase patterns, and other pertinent strategic data.

It is noted that the various elements/system of system 100 can interact and/or otherwise electronically communicate via computer/cellular/WIFI network(s) 104. Computer/cellular/WIFI network(s) 104 can include the Internet. Computer/cellular/WIFI network(s) 104 can include digital cellular networks. Computer/cellular/WIFI network(s) 104 can include local area networks and/or Wi-Fi networks.

FIG. 2 illustrates an example invoice management 106 system, according to some embodiments. Invoice management 106 can be implemented in on-premises servers and/or in a cloud-computing environment. Invoice management 106 system can be an intelligent and secure SaaS based platform that automates resource intensive invoicing process by integrating with an existing Procurement/ERP system. Invoice management 106 system can provide for automation of invoices. Invoice management 106 system can enable custom billing and reduce fraud, etc.

OCR module 202 can be used to implement optical character recognition on input text. More specifically, OCR module 202 can extract any plain text the form.

AI/ML parsing module 204 can provide AI enabled invoice management systems. AI/ML parsing module 204 can implement the various AI and/or ML functionalities discussed herein.

AI/ML parsing module 204 can use ML as a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

AI/ML module parsing module 204 can study and construct algorithms that can then learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

Consistent database(s) module 206 can store the extracted/parsed text in a database. Consistent database(s) module 206 can consistent format which may be input into a standard database.

Market intelligence/reporting module 208 can obtain the data from consistent database(s) module 206 can generate market intelligence/reports. Market intelligence/reporting module 208 can generate reports for internal analysis and/or reports to be sent to third party services to complete transactions and synchronized data. ERP interface 210 can provide APIs for external ERP systems (e.g. ERP system(s) 108) to query invoice management system 106. ERP interface 210 can also interact with external ERP systems to obtain additional information and/or instructions.

Invoice management system 106 can include other systems and functionalities (not shown) such as, inter alia: computer network communication functionalities, web servers, translation systems, database management systems, etc.

In one embodiment, invoice management system 106 can use either available APIs such as Open ICS or templates as is the case with SAP and their ERP, S/4HANA. This level of integration is achieved through the generation of standardized data by the AI component.

In one embodiment, invoice management system 106 can implement a three-way matching process can be employed to ensure consistency between all received POs. invoice management system 106 can provide an interface for exception handling. invoice management system 106 can also provide streamlining error handling for a supplier. Any signals or data sent from the supplier's own ERP (e.g. an SAP-based ERP). These can also be propagated to an internal interface (e.g. Skyscend Pay/Cratosys, etc.) via a JSON format.

In one embodiment, invoice management system 106 can provide a digitally invoice trading platform.

Invoice management system 106 can be used to implement Supply Chain Financing. Accordingly, invoice management system 106 can include an integrated solution built in for supply chain financing. For example, invoice management system 106 can act as an intermediary between three (3) parties: the supplier, the buyer, and the financial institution. The financial institution lends money to the supplier via trading of an approved invoice. Accordingly, invoice management system 106 can utilize a blockchain system. As noted supra, the blockchain can be a digital ledger where transactions are recorded chronologically and publicly. The blockchain used by the Invoice management system 106 is a digital ledger that serves as one source of truth between the parties (e.g. the buyer, supplier, and the financial institution). This enhances trust in doing business.

Figure 3:
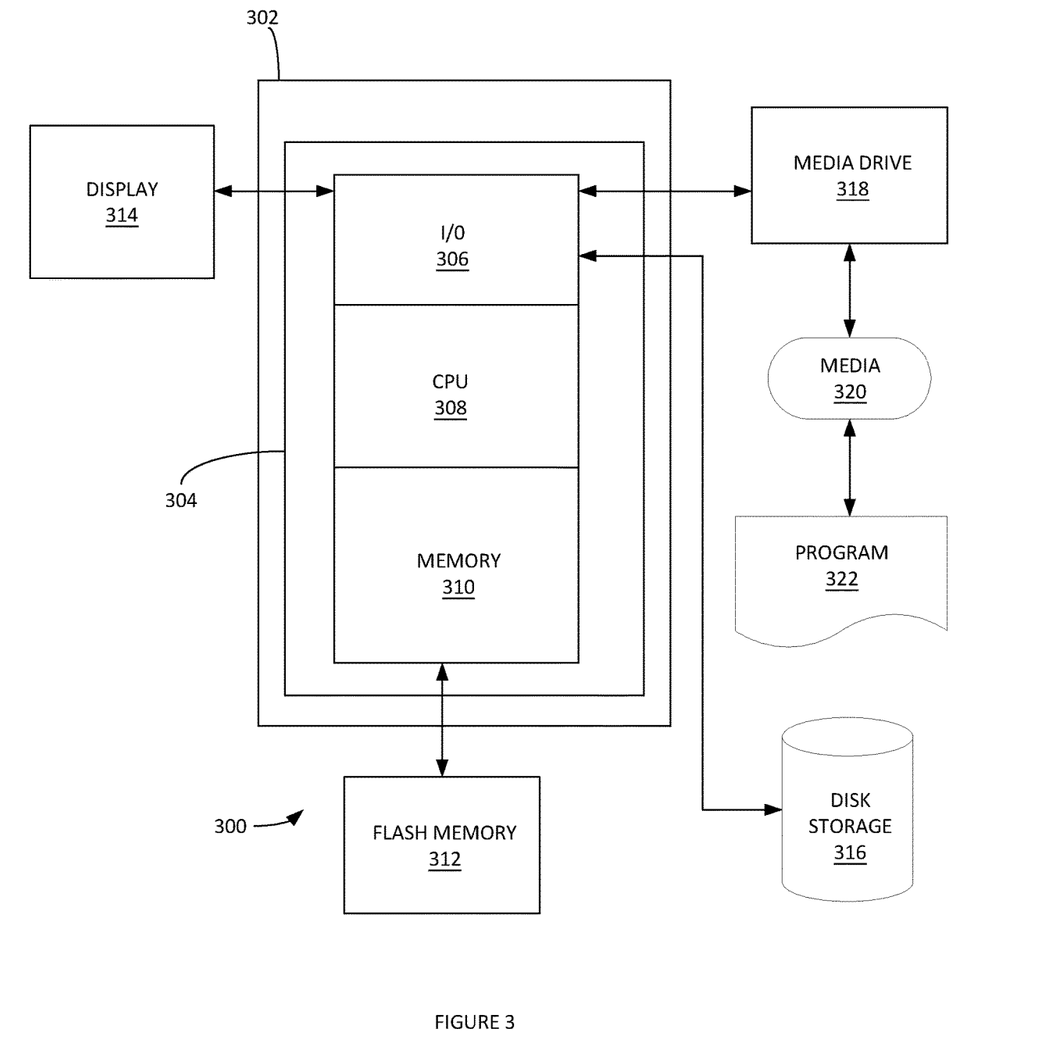
FIG. 3 is a block diagram of a sample computing environment that can be utilized to implement some embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. In another example, computing system 300 can be configured as a mobile device and include such systems as may be typically included in a mobile device such as GPS systems, gyroscope, accelerometers, cameras, etc.

Example Methods

FIG. 4 illustrates an example process 400 for automated invoice management and analysis, according to some embodiments. In step 402, an invoice management system (e.g. invoice management system 106 supra) can receive various forms of arbitrary format as input. In step 404, these forms are first processed (e.g. by via OCR system 104) to extract any plain text the form. In step 406, this plain text data is parsed (e.g. processed by an AI system, etc.) to put said input into a consistent format which may be input into a standard database. In step 408, this consistently formatted data can be used internally for manual analysis or for the generation of reports and/or it may be sent to third party services to complete transactions and synchronized data.

Figure 5:
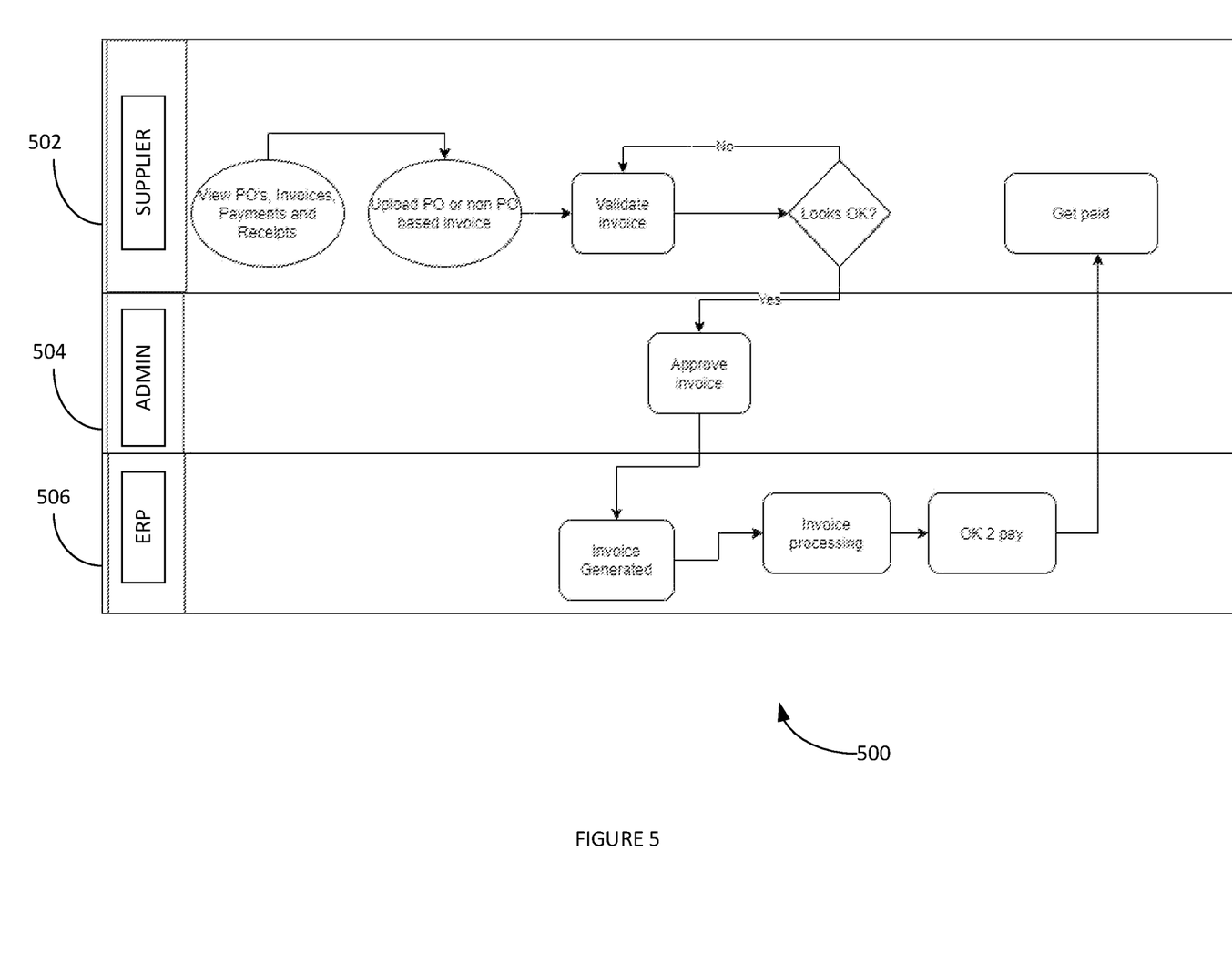
FIG. 5 illustrates another example process for invoice management, according to some embodiments.

FIG. 5 illustrates another example process 500 for invoice management, according to some embodiments. invoice management system 106 can manage process 500. Step 502 illustrates an example set of steps performed by a supplier. Step 504 illustrates an example set steps performed by an invoice management application administrator. Step 506 illustrates an example set an example set steps performed by an ERP. Moreover, process 500 can utilize the follow entities and their descriptions. Buyer Management can be on-boarded to invoice management system 106 (e.g. as a one-time activity, etc.). The buyer administrator can manage their profile in an invoice management system 106 application (e.g. a web-based application, a mobile device application, etc.). The buyer user can view the list of transacting suppliers that are onboarded on to invoice management system 106. The supplier management can use supplier's ERP Vendor ID and administrator details. Suppliers can be bulk onboarded onto invoice management system 106 as well. Once on-boarded, the supplier can receive a welcome letter email. Supplier users logs in using the temporary credentials and change the password upon first login. Supplier user can view purchase orders and invoices belonging to his/her organization along with Payments and Receipts. Purchase Order Management Purchase orders will be bulk pulled from SAP for the suppliers onboarded on invoice management system 106. New purchase orders will be pushed to invoice management system 106 in real-time and updates on the same will also be pulled into invoice management system 106. Invoice Management Invoice will be bulk pulled for suppliers onboarded on invoice management system 106. New invoices orders can be pushed to invoice management system 106, updates on the same can also be pulled into invoice management system 106. Role based access can be provided by invoice management system 106 as it supports two types of users. A first user can be an administrator user and the other can be regular user. The buyer and supplier administrators can create additional users in invoice management system 106.

A PO invoice upload supplier user (and/or Buyer's AP department user) can be provide by invoice management system 106 as well. A user can upload a PO invoice PDF document into invoice management system 106. The invoice details are extracted from PDF document via an AI based OCR technology. The supplier confirms/validates the details are correct. The PO invoice is validated and uploaded to an ERP system.

Non-PO invoices can also be uploaded. Supplier and buyer can upload non-PO invoice PDF document into invoice management system 106.

Invoice management system 106 s AI based OCR extracts invoice details and lets the supplier perform a round of validation before it gets uploaded as an invoice record in S4 ERP system. Three-way matching can be implemented. Invoice management system 106 can be configured to perform three-way matching of POs, receipts, and invoices before sending the invoice document to reduce errors on the ERP side.

Invoice management system 106 can implement an invoice approval workflow. In this way, the supplier and buyer can review, and approve/reject invoices being uploaded to an ERP dashboard. The supplier can view dashboard pertaining to helpful insights on the transaction documents like purchase orders pending to be invoiced, pending payment etc. The dashboard is configurable based on customer needs. Notifications suppliers can receive notifications for events such as when a new PO is cut against them or when an invoice is paid.

Figure 6:
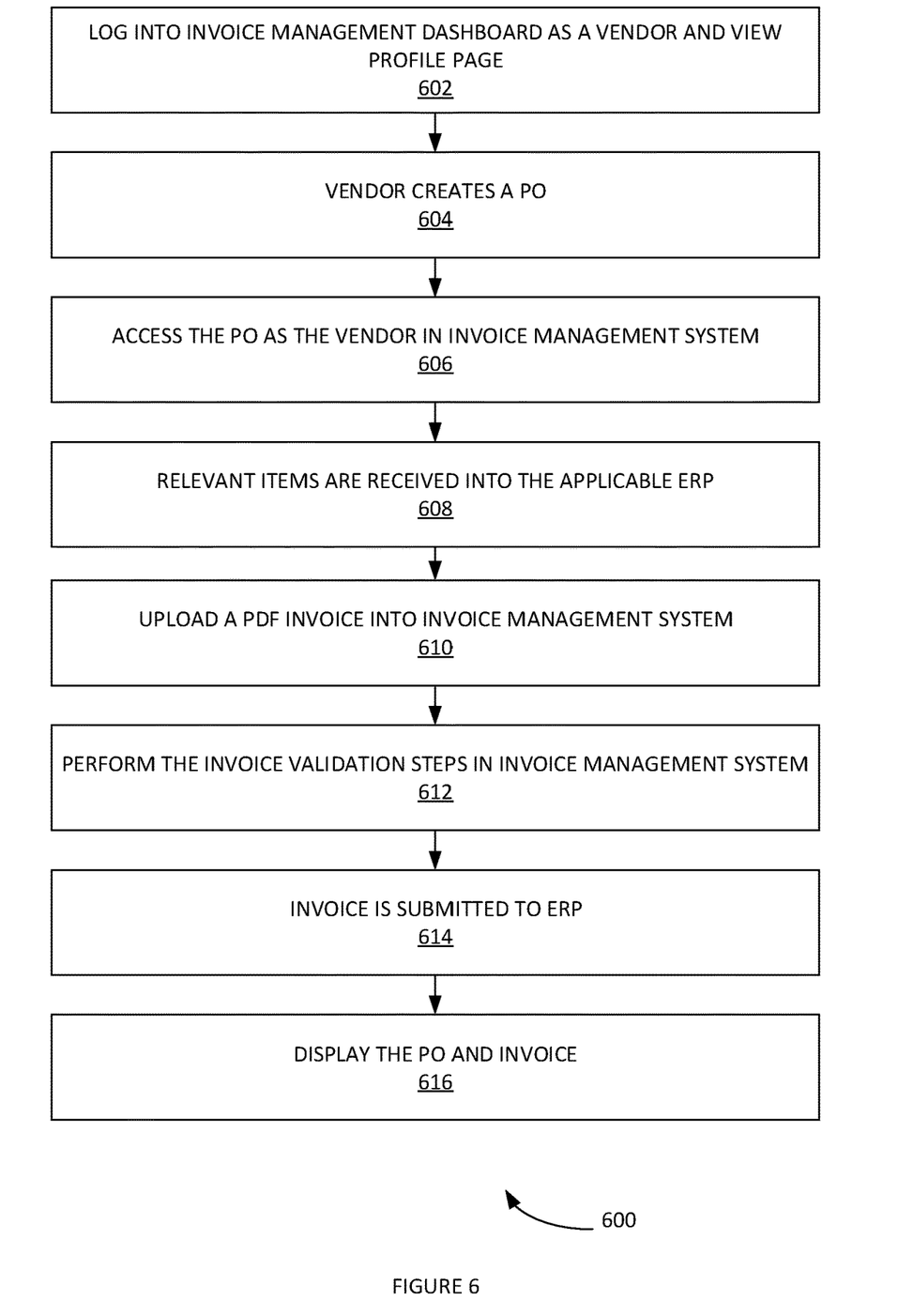
FIG. 6 illustrates an example process supporting automated invoice management, according to some embodiments.

FIG. 6 illustrates an example process 600 supporting automated invoice management, according to some embodiments. In step 602, process 600 enables an entity to log into invoice management dashboard as a vendor and view profile page. In step 604, the vendor creates a PO. In step 606, process 600 enable access to the PO as the vendor in invoice management system. In step 608, any relevant items are received into the applicable ERP. In step 610, process 600 a PDF is uploaded as an invoice into invoice management system. In step 612, process 600 performs the invoice validation steps in invoice management system (e.g. see supra). In step 614, process 600 the invoice is submitted to the ERP. In step 616, process 600 displays the PO and the invoice.

Figure 7:
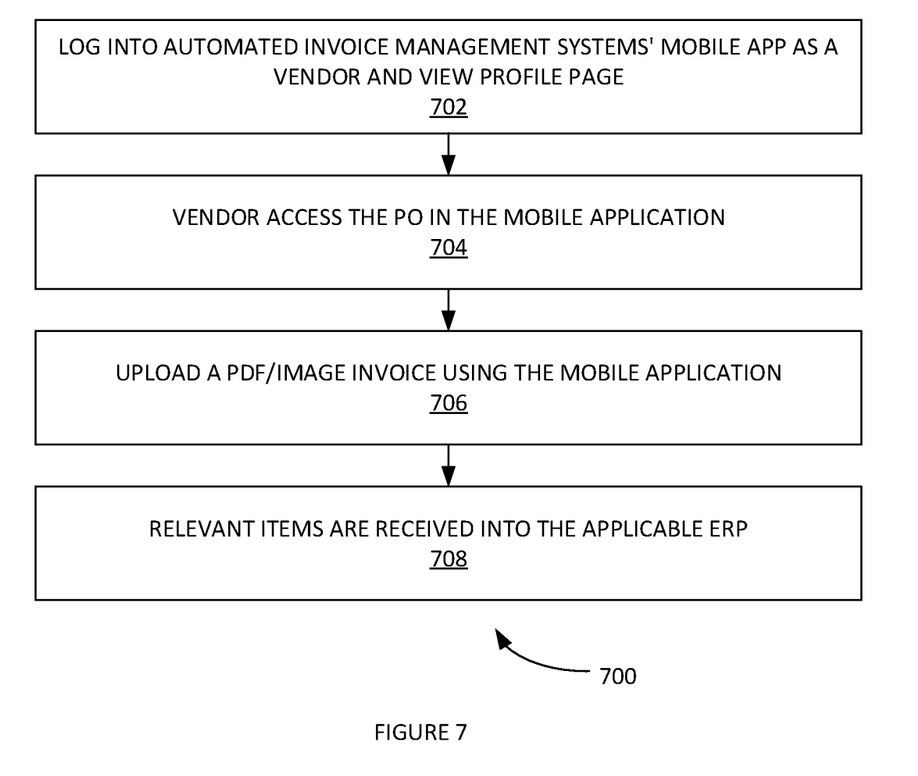
FIG. 7 illustrates an example process managing automated invoicing via a mobile device application, according to some embodiments.

FIG. 7 illustrates an example process 700 managing automated invoicing via a mobile device application, according to some embodiments. In step 702, process 700 can enable an entity to log into automated invoice management systems' mobile app as a vendor and view profile page. In step 704, process 700 can provide vendor access to the PO in the mobile application. In step 706, process 700 can enable a user to upload a PDF/image invoice using the mobile application. In step 708, process 700 can implement notifications. For example, notifications can be done when an invoice is approved and/or when a new PO is available.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of an automated invoice management and analysis comprising:
   with an invoice management system, receiving a purchase order or invoice in any digital image format;
   using an optical character recognition system to extract plain text the from the purchase order or invoice;
   parsing and formatting the plain text data with a machine learning system into a specified consistent format;
   communicating the formatted plain text data to a third-party service to complete a specified transaction; and
   wherein the specified third party comprises an enterprise resource planning platform (ERP) system,
   wherein the ERP system approves the invoice,
   providing a blockchain system comprising a digital ledger where transactions are recorded chronologically and publicly,
   wherein a financial institution lends money to a supplier via trading of an approved invoice,
   wherein a blockchain used by an invoice management system as a digital ledger that serves as one source of truth between the financial institution and a supplier,
   wherein the approval of the invoice by the ERP is stored on the blockchain, and
   with an invoice management system, ensuring consistency between the purchase order or invoice and another purchase order or invoice by:
      providing an interface for exception handling, and
      provide streamlining error handling for the supplier, wherein any signals or data sent from the ERP system are propagated to an internal interface of the invoice management system via a JSON format;
   on-boarding a buyer management system to the invoice management system as a one-time activity, wherein a buyer administrator uses the buyer management system to manage a buyer profile in the invoice management system application via a web-based application, wherein via the web-based application, the buyer administrator views a list of transacting suppliers that are onboarded on to invoice management system,
   wherein the supplier uses a supplier's ERP Vendor identifier and an administrator detail to be bulk onboarded onto the invoice management system;
   wherein the supplier uses the invoice management system to view purchase orders, Payments, Receipts, and invoices belonging to the supplier,
   wherein Purchase Order Management Purchase orders are bulk pulled from the supplier's ERP for the suppliers onboarded on invoice management system,
   wherein all new purchase orders are pushed to the invoice management system in real-time,
   wherein all updates on the new purchase orders are pulled into the invoice management system, and
   wherein the Invoice Management Invoice is bulk pulled for the supplier that is onboarded on invoice management system.

2. A computerized system useful for an automated invoice management and analysis comprising:
   at least one processor configured to execute instructions;
   at least one memory containing instructions when executed on the at least one processor, causes the at least one processor to perform operations that:
      with an invoice management system, receiving a purchase order or invoice in any digital image format;
      using an optical character recognition system to extract plain text the from the purchase order or invoice;
      parsing and formatting the plain text data with a machine learning system into a specified consistent format;
      communicating the formatted plain text data to a third-party service to complete a specified transaction;
      wherein the specified third party comprises an enterprise resource planning platform (ERP) system,
      wherein the ERP system approves the invoice,
      providing a blockchain system comprising a digital ledger where transactions are recorded chronologically and publicly,
      wherein a financial institution lends money to a supplier via trading of an approved invoice,
      wherein a blockchain used by an invoice management system as a digital ledger that serves as one source of truth between the financial institution and a supplier,
      wherein the approval of the invoice by the ERP is stored on the blockchain, and
      with an invoice management system, ensuring consistency between the purchase order or invoice and another purchase order or invoice by:
         providing an interface for exception handling, and
         provide streamlining error handling for the supplier, wherein any signals or data sent from the ERP system are propagated to an internal interface of the invoice management system via a JSON format;
   on-board a buyer management system to the invoice management system as a one-time activity, wherein a buyer administrator uses the buyer management system to manage a buyer profile in the invoice management system application via a web-based application, wherein via the web-based application, the buyer administrator views a list of transacting suppliers that are onboarded on to invoice management system,
   wherein the supplier uses a supplier's ERP Vendor identifier and an administrator detail to be bulk onboarded onto the invoice management system;
   wherein the supplier uses the invoice management system to view purchase orders, Payments, Receipts, and invoices belonging to the supplier,
   wherein Purchase Order Management Purchase orders are bulk pulled from the supplier's ERP for the suppliers onboarded on invoice management system,
   wherein all new purchase orders are pushed to the invoice management system in real-time,
   wherein all updates on the new purchase orders are pulled into the invoice management system, and
   wherein the Invoice Management Invoice is bulk pulled for the supplier that is onboarded on invoice management system.

* * * * *